United States Patent [19]

Narumi

[11] Patent Number: 5,270,603
[45] Date of Patent: Dec. 14, 1993

[54] COIL-END SUPPORTING APPARATUS AND A ROTARY-MACHINERY STATOR EQUIPPED WITH SAME

[75] Inventor: Eiji Narumi, Gunma, Japan

[73] Assignee: Sawafuji Electric Co., Ltd., Tokyo, Japan

[21] Appl. No.: 872,063

[22] Filed: Apr. 22, 1992

Related U.S. Application Data

[62] Division of Ser. No. 691,073, Apr. 25, 1991, abandoned.

[30] Foreign Application Priority Data

Apr. 28, 1990 [JP] Japan .................................. 2-111321
Feb. 15, 1991 [JP] Japan .................................. 3-12716

[51] Int. Cl.$^5$ ............................................. H02K 3/46
[52] U.S. Cl. ..................................... 310/260; 310/71; 310/91; 310/214; 310/270
[58] Field of Search .................... 310/260, 270, 71, 91, 310/214, 42, 208; 336/197

[56] References Cited

U.S. PATENT DOCUMENTS 4,585,964  4/1986  Hildebandt ............................ 310/71

FOREIGN PATENT DOCUMENTS 3604939  8/1987  Fed. Rep. of Germany ...... 310/260
61-43745  3/1986  Japan ................................. 310/260

*Primary Examiner*—R. Skudy
*Attorney, Agent, or Firm*—McGlew and Tuttle

[57] ABSTRACT

A coil-end supporting apparatus comprising a holder comprising retainers for supporting the coil ends of a rotary machinery stator at both ends of a bar- or plate-shaped support and an insert perpendicularly intersecting the intermediate portion of the support in such a manner as to be inserted into a slot of a stator core; the holder supporting the coil ends; and a rotary-machinery stator equipped with the coil-end supporting apparatus.

6 Claims, 9 Drawing Sheets

COIL-END SUPPORTING APPARATUS AND A ROTARY-MACHINERY STATOR EQUIPPED WITH SAME

This is a divisional application of application Ser. No. 07/691,073 filed Apr. 25, 1991 now abandoned.

BACKGROUND OF THE INVENTION

This invention relates to a coil-end supporting apparatus for supporting the coil ends of a rotary-machinery stator having a plurality of slots extending axially at circumferential intervals on the internal circumferential surface of the stator core, and coils each wound across both ends of the stator core, passing through two of the slots, and a rotary-machinery stator equipped with the same.

DESCRIPTION OF THE PRIOR ART

Stators of a conventional type for rotary machinery, such as generators and motors, have heretofore employed a coil-end terminating means for connecting lead wires to the connecting ends of coils wound in the stator slots by soldering, and covering the lead wires with insulating tubes and bundling and fitting the lead wires to the coil ends.

The conventional coil-end terminating means has multiple coil ends, often in a complicated state, on both ends of the stator core, and usually leaves the coil ends in an unstable state. It also involves quite complex coil-end bundling operations, and connecting operations with lead wires, which impose problems of considerable time and labor. A plurality of lead wires are usually needed since they are used not only for feeding power to coils, but also for controlling and other purposes. This requires an unnecessarily large space for them, deteriorating the external appearance.

As a means for solving these problems, the present Applicant previously proposed an improved coil-end connecting construction, as disclosed in Japanese Published Unexamined Utility Model Application No. 43745/1986.

FIG. 1 is a perspective view of the essential part of the coil-end connecting construction previously proposed by the present Applicant. FIG. 2 is an enlarged front view of the essential part of FIG. 1. FIG. 3 is an enlarged exploded perspective view of component members in FIGS. 1 and 2. In these figures, reference numeral 1 refers to a stator used in rotary machinery, such as generators and motors, having a cylindrical stator core 2 on which coils 3 are wound.

On the internal circumferential surface of the stator core 2, provided at circumferential intervals, are a plurality of slots 4 extending along the axial direction of the stator core 2. The coil 3 is wound across both ends of the stator core 2, passing through two of the slots 4. Into an empty slot 4a inserted is a holder 5, made of a synthetic resin, with which a coupler 6 is substantially integrated. Furthermore, the coil ends 3a located at an end of the stator core 2 are supported by the holder 5.

The holder 5 consists of a support 9 extending linearly and an insert 10 perpendicularly intersecting the support 9, both formed into an almost T shape. The insert 10 is formed to have a reduced width portion the width of which is reduced from the tip to the middle thereof so that only the tip portion of the insert 10 can be inserted into the slot 4. At the tip of the insert 10 are a plurality of projections 11 to prevent the insert 10 inserted into the slot 4 from coming off from the slot 4 with a slight external force, when the insert 10 is inserted into the slot 4. In such a holder 5, the length of the insert 10 is set so that when the tip of the insert 10 is inserted into the slot 4, the support 9 is located at a position opposite to the stator core 2 with respect to the coil end 3a. On the insert 10 is a vertically extending groove (not shown) for housing the connecting end of the coil 3; the connecting end being drawn out by being passed through the support 9 to connect to the coupler 6.

The coupler 6 has a plurality of male or female terminals, and a flange 12 at the bottom thereof, as shown in the figures. This type of coupler, which is well known, is placed on the holder 5 in such a fashion that the flange 12 comes in contact with the support 9. To substantially integrate both the support 9 and the coupler 6, connecting members 17 and 18 are inserted on both ends of the support 9 and the flange 12 of the coupler 6. That is, inserting holes 19 and 20 for accepting the support 9 and the flange 12 are provided on the connecting members 17 and 18. By inserting both ends of the support 9 and the flange 12 into the inserting holes 19 and 20, the holder 5 and the coupler 6 are substantially integrated with each other.

On both sides of the support 9 and on both sides of the insert 10 are engaging grooves 13 and 14 extending in parallel with the extending direction of the insert 10. The connecting members 17 and 18, on the other hand, have engaging pawls 15 and 16 for engaging with the engaging grooves 13 and 14 at the tip thereof in the inserting direction. These engaging pawls 15 and 16 can be resiliently bent in contact with both sides of the support 9 when the connecting members 17 and 18 are inserted into the support 9 and the coupler 6, and can be resiliently engaged with the engaging grooves 13 and 14 when the coupler 6 is substantially integrated with the support 9 to prevent the connecting members 17 and 18 from falling from the support 9.

On the connecting members 17 and 18 integrally provided are skirts 25 and 26 having arc-shaped recesses 23 and 24 for engaging with the coil end 3a. The inside surface of the arc-shaped recesses 23 and 24 have a plurality of mutually spaced ridges 27 and 28. Varnish-injecting holes 29 and 30 are proved on both sides of the skirts 25 and 26. On the connecting members 17 and 18 are semi-circular shoulders 31 and 32, on which fasteners 33 and 34 for fastening the coil end 3a and the connecting members 17 and 18 can be wound.

When terminating the coil 3 on the coil-end connecting apparatus having the above construction, the connecting end of the coil 3 is drawn out of the support 9 from the inserting portion 10 of the holder 5, and the insert 10 is inserted into an empty slot 4. Then, the coupler 6 is caused to come in contact with the support 9 in a state where the coupler 6 is connected to the connecting end of the coil 3. In this state, the connecting members 17 and 18 are engaged with the flange 12 of the coupler 6 and the support 9 while the recesses 23 and 24 are engaged with the coil end 3a. At this time, by engaging the engaging pawls 15 and 16 with the engaging grooves 13 and 14, the coupler 6 is substantially integrated at a predetermined position of the support 9 without the fear of the connecting members 17 and 18 falling even when an external force is exerted on the connecting members 17 and 18 in such a direction that the connecting members 17 and 18 falls from the support 9.

When varnish is injected through the varnish injecting holes 29 and 30 in this state, varnish pools are formed between the ridges 27 and 28. Thus, the connecting members 17 and 18 are integrated with the coil end 3a as varnish solidifies. Furthermore, the coupler 6 and the holder 5 are fastened with the coil end 3a by means of the fasteners 33 and 34. Electrical connection of the coil 3 is then accomplished by connecting mating coupler (not shown) to the coupler 6.

With the aforementioned coil-end connecting construction, termination of the coil 3 is very easy, the coil end 3a is positively secured and external appearance is improved. But there remain following problems.

That is, a total of six members, namely, the support 9, the connecting members 17 and 18, the coupler 6 and the fasteners 33 and 34, are required as members constituting the holder 5. This involves complex parts management, troublesome assembly operation and much time and labor.

Although the fasteners 33 and 34 are used to fasten the coil end 3a to the holder 5, the external shape of the coil end 3a may vary depending on the bundling state of strands forming the coil end 3a. As a result, the distance between the stator core 2 and the coil end 3a may vary, posing the danger of interference among the related component members disposed near the coil end 3a.

Moreover, since the direction in which the terminals are connected to the coupler 6 is limited to the upward direction, the arrangement of the coupler 6 has to be changed to change the connecting direction of the terminals. This presents the problem of insufficient flexibility.

SUMMARY OF THE INVENTION

It is the first object of this invention to provide a coil end supporting apparatus that lends itself to easy and efficient termination of coils and improves external appearance, and a rotary machinery stator equipped with the same.

It is the second object of this invention to provide a coil end supporting apparatus that prevents interference among related component members and facilitates assembly operations, and a rotary machinery stator equipped with the same.

It is the third object of this invention to provide a coil end supporting apparatus that offers great freedom in selecting terminal connecting direction, and a rotary machinery stator equipped with the same.

DETAILED DESCRIPTION OF THE EMBODIMENT

Figure 1:
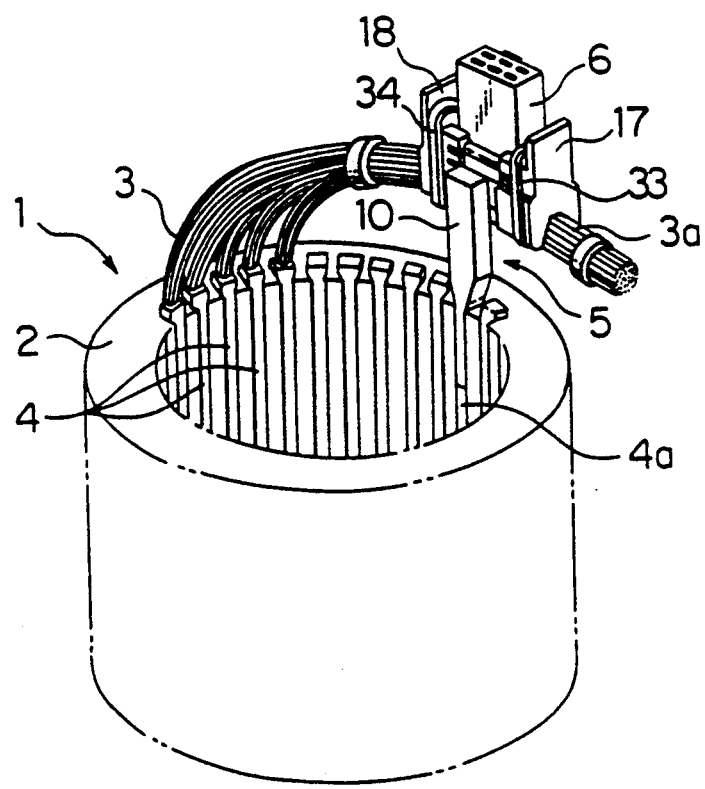
FIG. 1 is a perspective view of the essential part of a coil end connecting construction of a conventional type.
Figure 2:
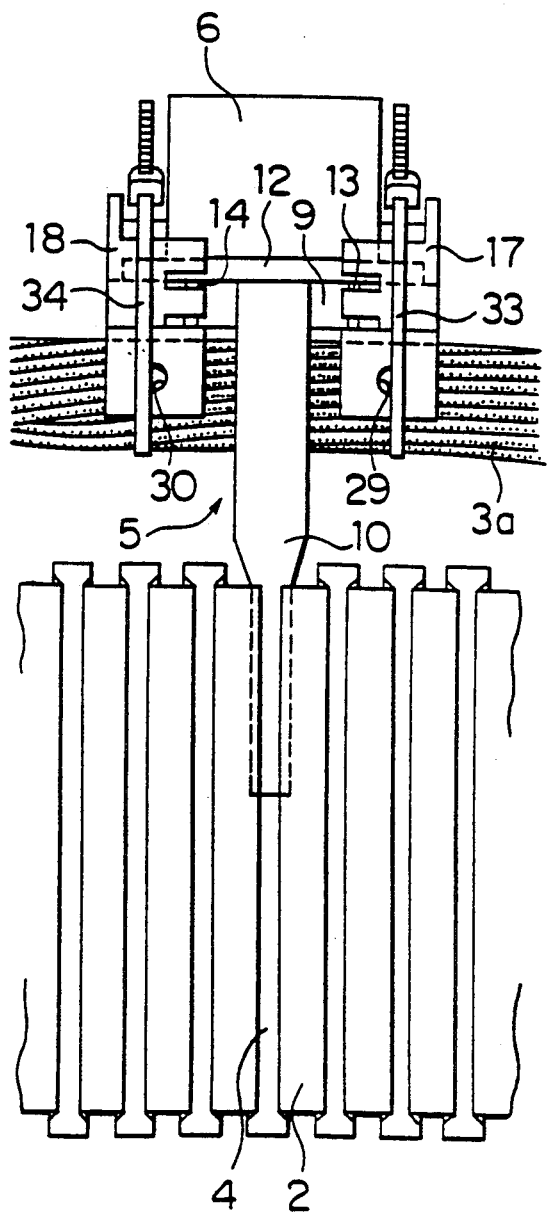
FIG. 2 is an enlarged front view of the essential part of FIG. 1.
Figure 3:
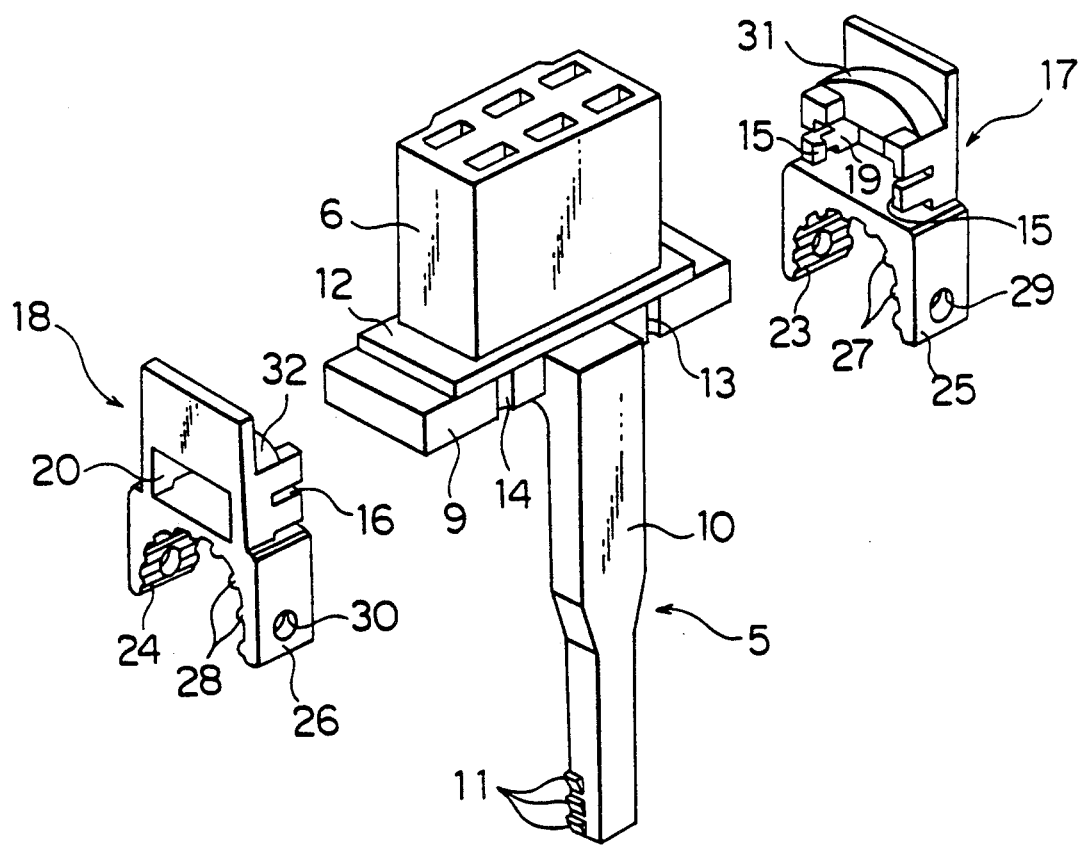
FIG. 3 is an enlarged exploded perspective view of component members used in FIG. 2.
Figure 4:
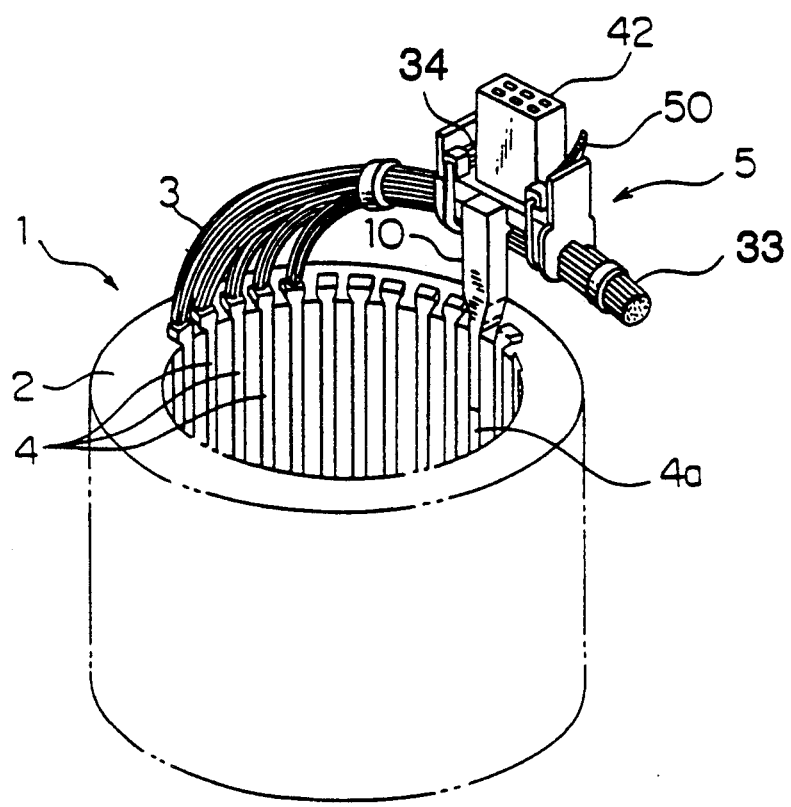
FIG. 4 is a perspective view of the essential part of an embodiment of this invention.
Figure 5:
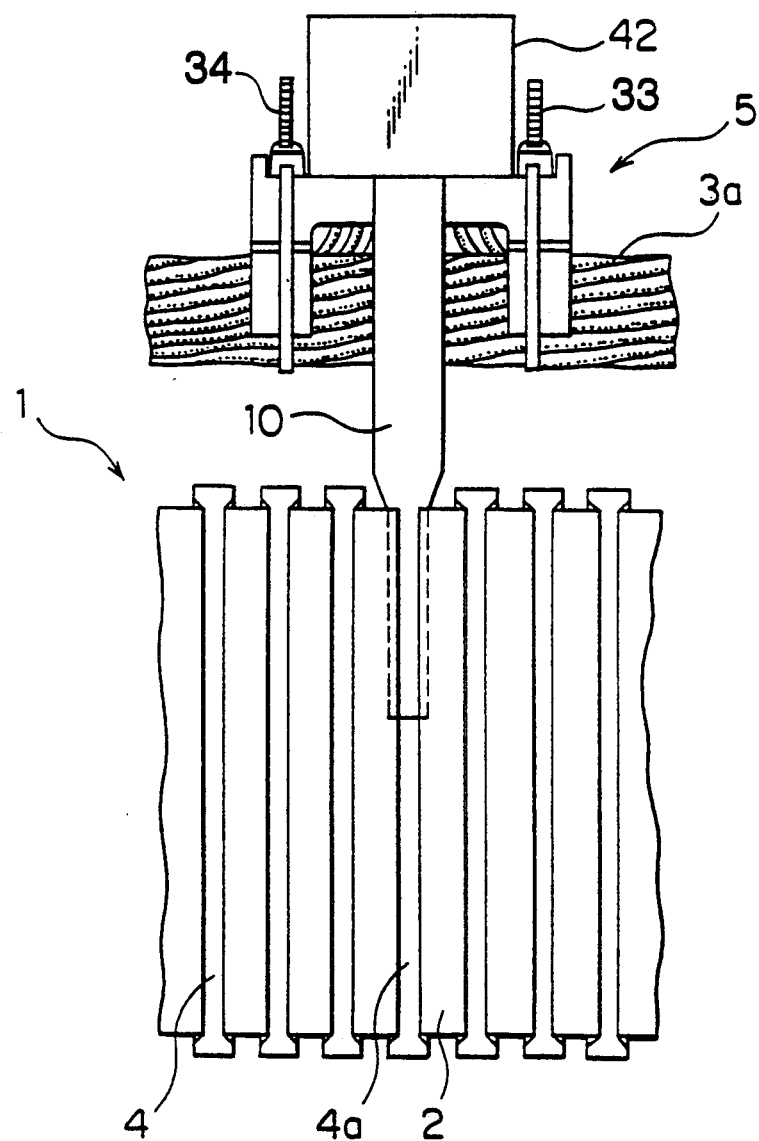
FIG. 5 is an enlarged front view of the essential part of FIG. 4.
Figure 6:
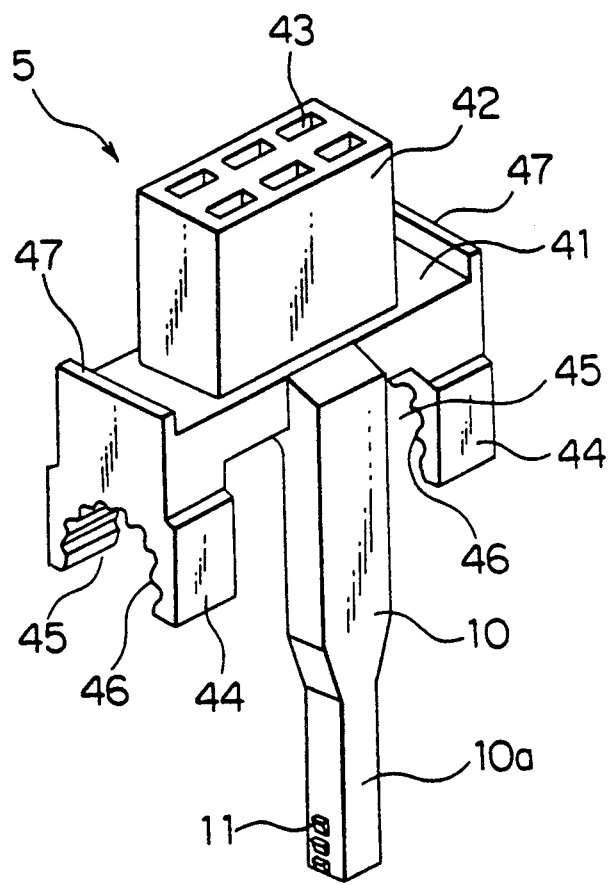
FIG. 6 is an enlarged perspective view illustrating a holder shown in FIGS. 4 and 5.

FIG. 4 is a perspective view of the essential part of an embodiment of this invention, FIG. 5 is an enlarged front view of the essential part of FIG. 4, and FIG. 6 is an enlarged perspective view illustrating a holder shown in FIGS. 4 and 5. Like parts are shown by like reference numerals shown in FIGS. 1 through 3.

In FIGS. 4 and 5, the holder 5 has a construction which will be described later, and supports the coil end 3a by fastening the coil end 3a and inserting the insert 10 into an empty slot 4a of the stator core 2.

In FIG. 6, numeral 41 refers to a support formed into a flat plate shape having a rectangular projected shape. Element 42 refers to a coupler formed into a rectangular prism, having a plurality of terminal mounts 43 for mounting male or female terminals and placed on the support 41. Through holes (not shown) for connecting the connecting end of the coil 3 shown in FIG. 4 to the male or female terminals are provided at almost the central part of the support 41 so that the through holes connect to the terminal mounts 43.

Numeral 44 refers to a skirt having recesses 45 which are formed into an arc shape so as to house the coil end 3a shown in FIGS. 4 and 5, and disposed on both sides (narrow sides) of the support 41. A plurality of mutually spaced ridges are provided on the inside surface of the arc-shaped recesses 45. Numeral 47 denotes a locking portion provided on both sides (narrow sides) of the upper surface of the support 41.

Numeral 10 is an insert provided on an edge side (broad side) at the middle of the support 41 so that the insert 10 perpendicularly intersects the upper part of the support 41 in a T shape, for example. The insert 10 has a reduced-width portion from the middle to the tip thereof so that only the tip portion 10a of the insert 10 can be inserted into the slot 4a shown in FIGS. 4 and 5. A plurality of ridges 11 are provided on the tip portion 10a of the insert 10 so as to prevent the tip portion 10a, when inserted into the slot 4a, from coming off from the slot 4a with a slight pulling force.

The length of the insert 10 and the height of the insert 10 projected from the edge side of the support 41 are set so that when the tip portion 10a of the insert 10 is inserted into the slot 4a, the support 41 matches with the coil end 3a shown in FIG. 4 and is disposed on the opposite side to the stator core 2. The support 41, the coupler 42, the skirt 44, the locking portion 47 and the insert 10 are formed integrally by an injection molding means, for example, to constitute the holder 5.

In the following, procedures for terminating the end of the coil 3 with the above-mentioned construction will be described, referring to FIGS. 4 through 6. The connecting end (not shown) of the coil 3 is aligned and trimmed to a predetermined length and connected by soldering or a solderless connecting means to a male or female terminal (not shown), and the terminal is fixedly fitted to the terminal mount 43 of the coupler 42 through the through hole (not shown) on the support 41.

Next, the insert 10 of the holder 5 is inserted or fitted into an empty slot 4a of the stator core 2, and the coil end 3a is housed in the arc-shaped recess 45 and fastened to the support 41. Then, by connecting the coupler 42 to the matching coupler (not shown), electrical connection of the coil 3 is completed. The aforementioned construction makes it possible to facilitate termination of the coil 3, positively secure the coil end 3a, and improve external appearance.

Figure 7:
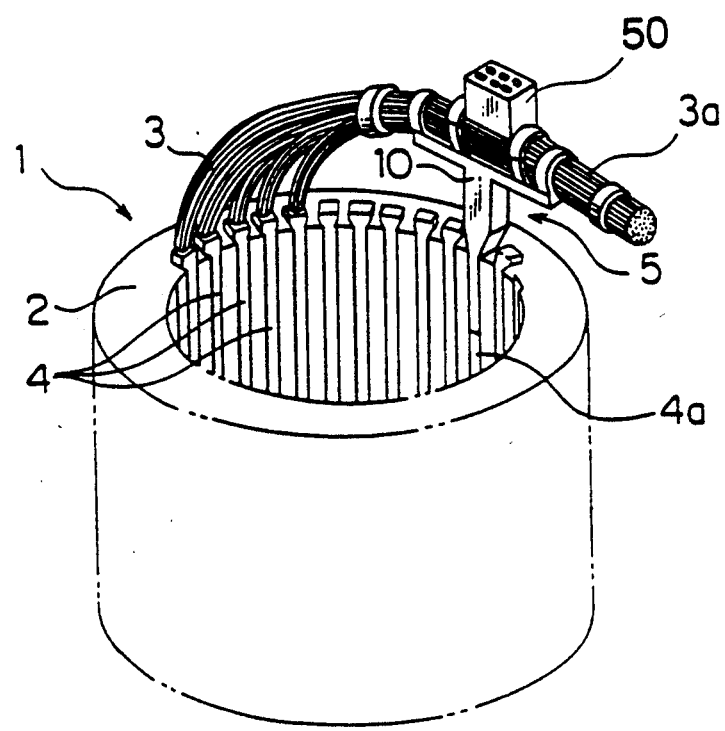
FIG. 7 is a perspective view of the essential part of another embodiment of this invention.
Figure 8:
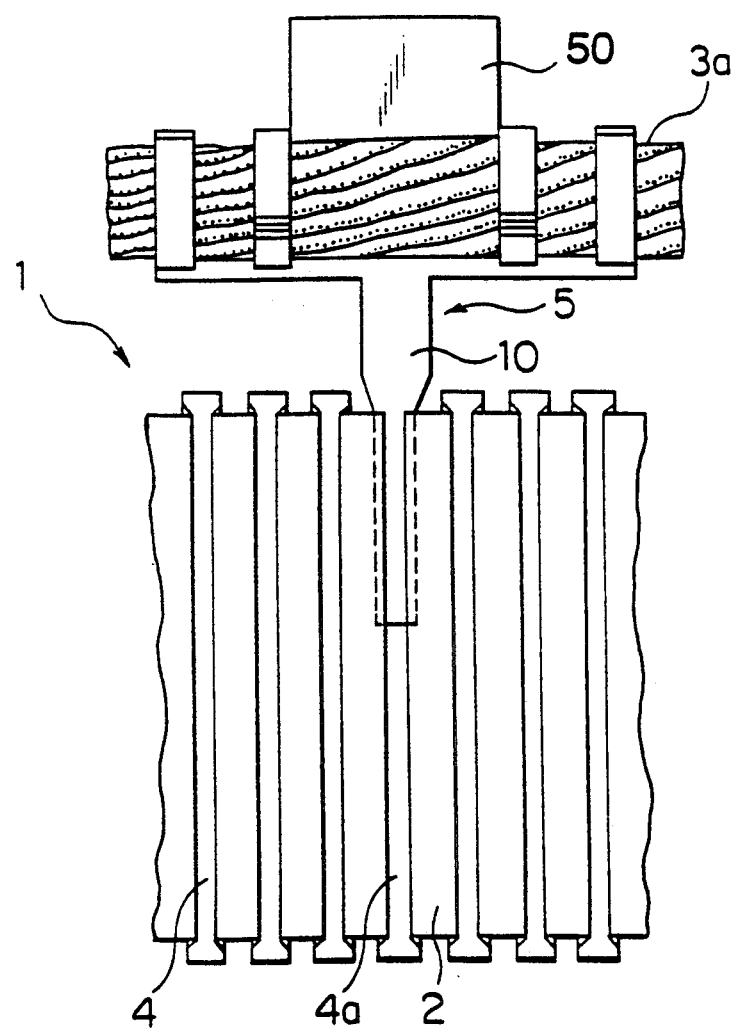
FIG. 8 is an enlarged front view of the essential part of FIG. 7.
Figure 9:
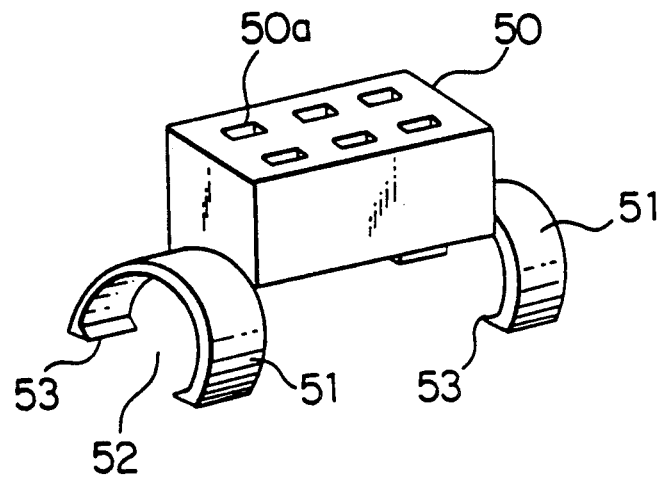
FIG. 9 is an enlarged perspective view illustrating a coupler shown in FIGS. 7 and 8.
Figure 10:
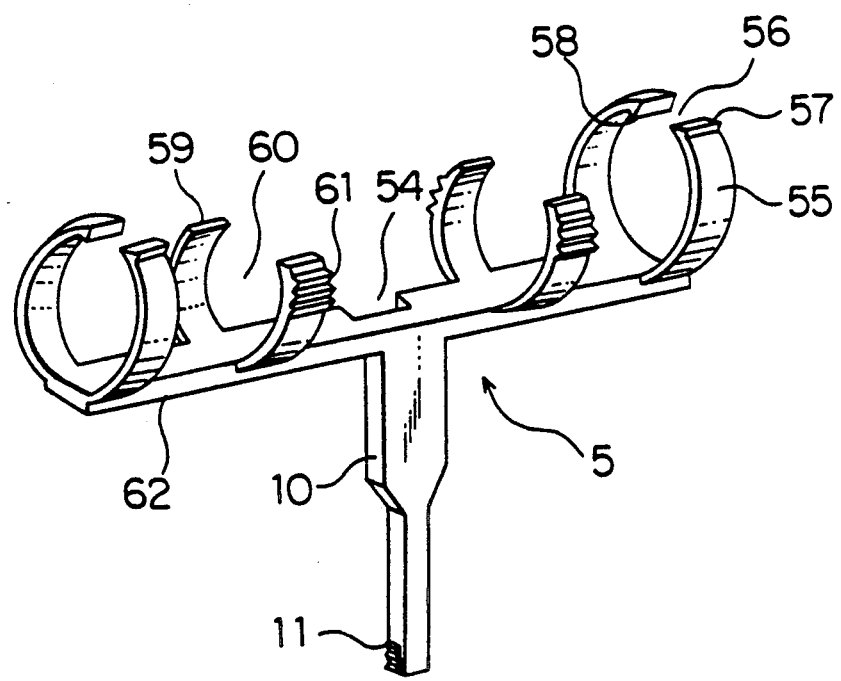
FIG. 10 is an enlarged perspective view illustrating a holder shown in FIGS. 7 and 8.

FIG. 7 is a perspective view of the essential part of another embodiment of this invention, FIG. 8 is an enlarged front view of the essential part of FIG. 7, and FIGS. 9 and 10 are enlarged perspective view illustrating the coupler and the holder shown in FIGS. 7 and 8. Like parts are indicated by like numerals shown in FIGS. 4 through 6.

In FIGS. 7 and 8, the holder 5 and the coupler 50 are constructed as will be described later. Like the abovementioned embodiment, the coil end 3a is supported by fastening the coil end 3a, to the holder 5 and inserting the insert 10 into an empty slot 4a of the stator core 2.

In FIG. 9, numeral 51 refers to coupler connecting portions provided integrally at an end in the longitudinal direction of the coupler 50. The coupler connecting portions 51 are formed into a semi-circular shape having an opening 52, and an engaging pawl 53 is provided on the connecting portion 51 in such a fashion as to protrude outwardly so that the engaging pawl 53 can be engaged with a connecting part of the holder 5, which will be described later. Numeral 50a denotes a terminal mount provided on the upper part of the coupler 50.

In FIG. 10, the support 62 is formed into a bar or flat plate shape, and has an insert 10 in the middle of the support 62 in such a fashion as to perpendicularly intersect the longitudinal direction of the support 62. Numeral 54 denotes a notch passing through the middle part of the support 62. The notch 54 allows lead wires for connecting the coil 3 shown in FIG. 7 and the coupler 50 shown in FIG. 9 to pass.

Numeral 55 denotes an arc-shaped retainer provided on each end of the support 62 in the longitudinal direction. The arc-shaped retainer 55 is formed into a semicircular shape with an opening 56 directed upward. Engaging portions 57 and 58 formed in such a manner as to engage with each other are provided on both sides of the opening 56. The inside dimensions and shape of the arc-shaped retainer 55 is determined appropriately in such a manner as to hold the coil end 3a shown in FIGS. 7 and 8.

Numeral 59 denotes a holder connecting portion provided between the arc-shaped retainer 55 and the insert 10. The holder connecting portion 59 is formed into a semi-circular shape with an opening 60 directed upward. On the external circumferential surface are a plurality of engaging portions 61. The holder connecting portion 59 is formed in such a fashion as to connect with the coupler connecting portion 51 shown in FIG. 9 and to allow the engaging pawl 53 to engage with the engaging portion 61.

The support 62, the insert 10, the arc-shaped retainer 55 and the holder connecting portion 59 are formed integrally to constitute the holder 5. As a means to form these, an injection molding means using thermoplastic resin, such as NYLON6 is effective.

In the following, procedures for terminating the coil 3 with the aforementioned construction will be described, referring to FIGS. 7 through 10. The insert 10 of the holder 5 is inserted or fitted into an empty slot 4a of the stator core 2. Next, the connecting end (not shown) of the coil 3 is aligned and trimmed to a predetermined length, connected to a male or female terminal (not shown) by soldering or a solderless connecting means, and the terminal is fitted to the terminal mount 50a of the coupler 50 through the notch 54 of the support 62. The coil end 3a is housed in the arc-shaped retainer 55 and the holder connecting portion 59. In this state, the coil end 3a is easily housed since the arc-shaped retainer 55 and the holder connecting portion 59 have the openings 56 and 60.

Next, the opening 56 of the arc-shaped retainer 55 is closed and the engaging portions 57 and 58 are engaged with each other to hold and fasten the coil end 3a. As the coupler 50 is forced onto the holder 5, the coupler connecting portion 51 is fitted to the holder connecting portion 59 and the engaging pawl 53 engages with the engaging portion 61, and thus the coupler 50 is fixedly fitted to the holder 5. By matching the coupler 50 with the mating coupler (not shown), electrical connection of the coil 3 is completed.

With the aforementioned construction, termination of the coil 3 is facilitated, the coil end 3a is positively secured, and external appearance is improved.

In the foregoing description of this embodiment, component members of the holder as a coil-end supporting apparatus are integrally formed by an injection molding means, but they can be molded by cast molding, compression molding and other molding means. Also, they can be formed by first separately molding part of whole of the component members, and then assembling them into an integral piece using adhesive, etc. The shape and dimensions of each component member may be selected appropriately, depending on the shape and dimensions of the rotary machinery stator to which the component members are applied, and are not limited to those described in this embodiment.

In this embodiment, furthermore, upwardly opened openings of the arc-shaped retainer and the connecting portion have been described, but the opening direction of these openings is not limited to it. These openings directed obliquely upward or sideward may serve the purpose of allowing the coil end to pass.

This invention having the aforementioned construction and operation can achieve the following effects.

(1) Coils can be easily and positively terminated, coil ends can be positively secured, and external appearance can be improved.

(2) By adopting the construction of supporting coil ends from underside by the holder, the distance between the stator core and the coil ends can be kept constant, thus eliminating the interference with related component members disposed nearby.

(3) The use of a few members to form a coil-end supporting apparatus facilitates assembly operation and substantially reduce manhours and time.

(4) By changing the fitting direction of the coupler, the direction of connecting terminals can be changed, and the degree of freedom can be increased.

What is claimed is:

1. A coil-end supporting apparatus, comprising: a bar-shaped support with longitudinal ends; arc-shaped retainers having openings and engaging portions for holding coil ends of a rotary machinery stator, said arc-shaped retainers being provided on both longitudinal ends of said bar-shaped support, an insert formed in such a fashion as to be inserted into a slot of a stator core is provided in a middle of said bar-shaped support in such a manner as to substantially perpendicularly intersect a longitudinal direction of said bar-shaped support; holder connecting portions having openings and a plurality of engaging portions on an external circumferential surface thereof are provided on said bar-shaped support between said insert and said arc-shaped retainers; said bar-shaped support, said arc-shaped retainers, said insert, and said holder connecting portions being integrally formed to constitute a single piece holder; a coupler having a terminal mount, coupler connecting portions being provided on said coupler at ends of said terminal mount, said coupler connecting portions formed integral with said terminal mount, and said coupler connecting portions having engaging pawls for engaging with said engaging portions, said coupler being connected to said holder via said holder and coupler connecting portions.

2. A coil-end supporting apparatus comprising: a holder including a bar-shaped support, said bar-shaped support having first and second longitudinal ends; an insert connected to said bar-shaped support at a middle location of said bar-shaped support, between said first and second longitudinal ends, said insert extending substantially perpendicularly with respect to said bar-shaped support for insertion into a slot of a stator core; a first arc-shaped retainer connected to said bar-shaped support at said first longitudinal end; a second arc-shaped retainer connected to said bar-shaped support at said second longitudinal end; a first holder connecting portion having a connecting opening and having a plurality of engaging portions on an external circumferential surface thereof, said first connecting portion being provided on said bar-shaped support between said insert and said first longitudinal end; a second holder connecting portion having an opening and a plurality of engaging portions on an external circumferential surface thereof, said second connecting portion being connected to said bar-shaped support between said insert and said second longitudinal end, said bar-shaped support, said insert, said first arc-shaped retainer, said second arc-shaped retainer, said first holder connecting portion and said second holder connecting portion being formed integral; a coupler having a first end and a second end; a first end coupler connecting portion having engaging pawls for engaging said engaging portions of said first holder connecting portion; a second end coupler connecting portion having engaging pawls for engaging said engaging portions of said second holder connecting portion, said coupler, said first end coupler connecting portion and said second end coupler connecting portion being formed integral.

3. A coil-end supporting apparatus comprising:
a holder including a support and an insert having an end connected to said support, another end of said insert having means for inserting into a slot of a stator core, said holder including an arc-shaped retainer means connected to said support end for housing a coil end of the stator core, said holder also including a holder connecting portion;
a coupler connectable to said holder, said coupler including a terminal mount for a connecting end of a coil of the stator core, said coupler also including a coupler connecting portion, said coupler connecting portion and said holder connecting portion having engagement means for connecting said coupler connecting portion with said holder connecting portion, thereby connecting said coupler to said holder.

4. An apparatus in accordance with claim 3, wherein:
said insert extends from said support in a direction substantially perpendicular to said support.

5. An apparatus in accordance with claim 4, wherein:
said arc-shaped retainer means extends from said support in a direction substantially opposite to said insert.

6. An apparatus in accordance with claim 3, wherein:
said holder connecting portion and said coupler connecting portion wrap around said coil end.

* * * * *